No. 623,213. Patented Apr. 18, 1899.
W. HOLMES, G. PENNY & J. HODGSON, Jr.
MACHINE FOR MAKING LABELS.
(Application filed June 7, 1897.)

(No Model.) 8 Sheets—Sheet 1.

Witnesses:

Inventors:
William Holmes
George Penny
James Hodgson Jr.
By
their Attorneys.

No. 623,213. Patented Apr. 18, 1899.
W. HOLMES, G. PENNY & J. HODGSON, Jr.
MACHINE FOR MAKING LABELS.
(Application filed June 7, 1897.)
(No Model.) 8 Sheets—Sheet 3.
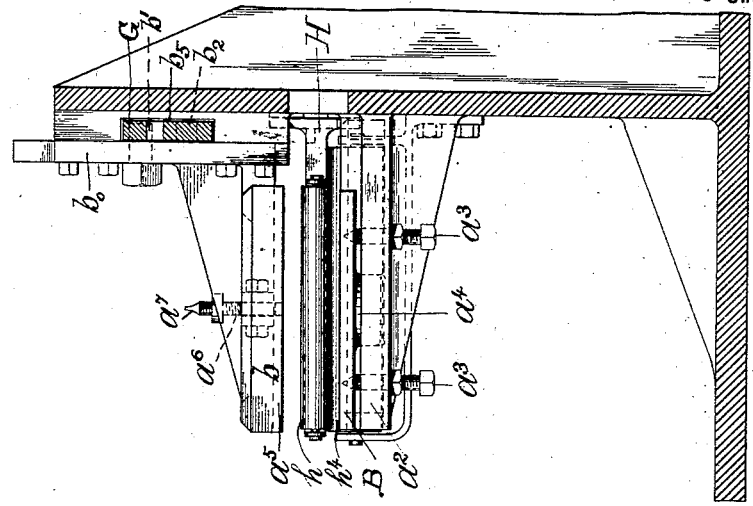
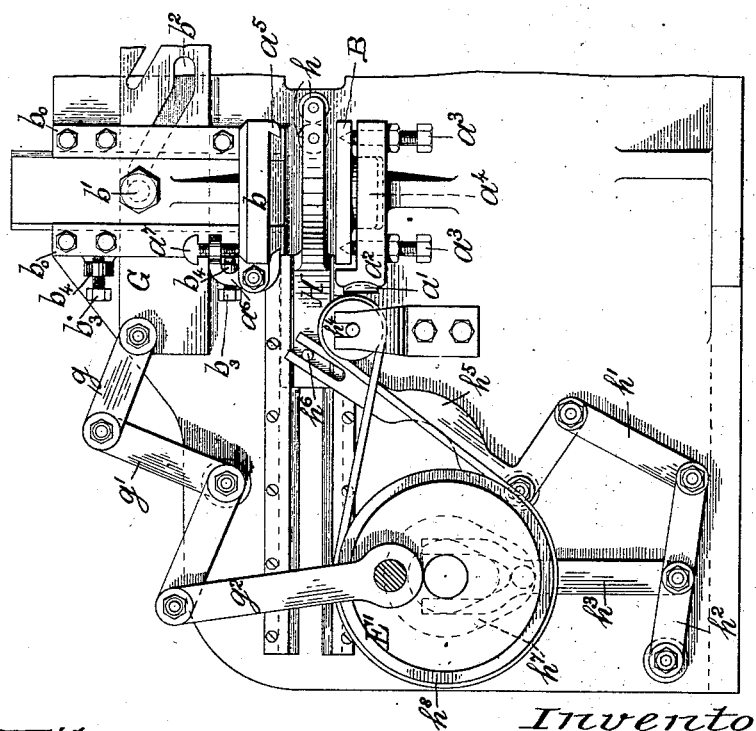
Witnesses:
Inventors:
William Holmes
George Penny
James Hodgson Jr
By
their Attorneys.

No. 623,213. Patented Apr. 18, 1899.
W. HOLMES, G. PENNY & J. HODGSON, Jr.
MACHINE FOR MAKING LABELS.
(Application filed June 7, 1897.)
(No Model.) 9 Sheets—Sheet 4.
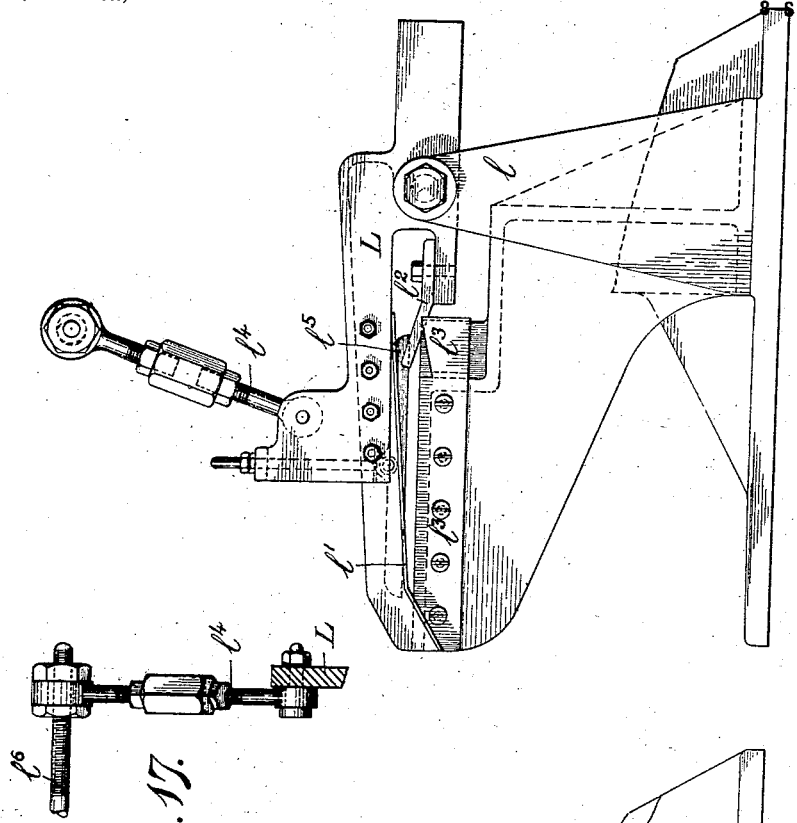
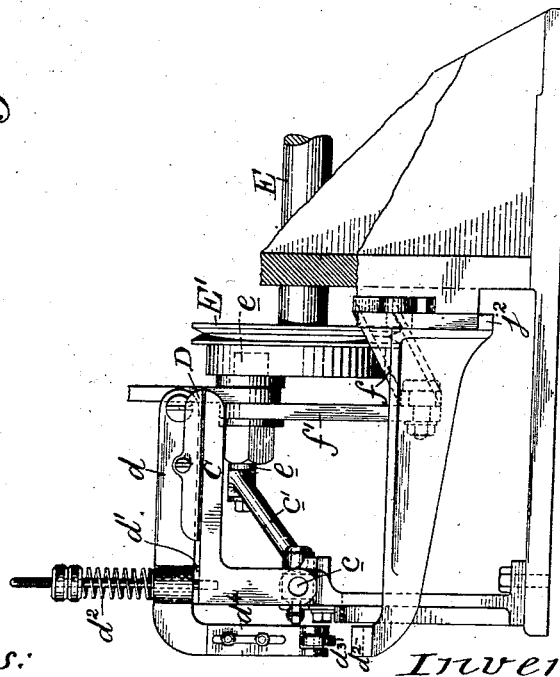
Witnesses:
Inventors:
William Holmes
George Penny
James Hodgson Jr.
By their Attorneys

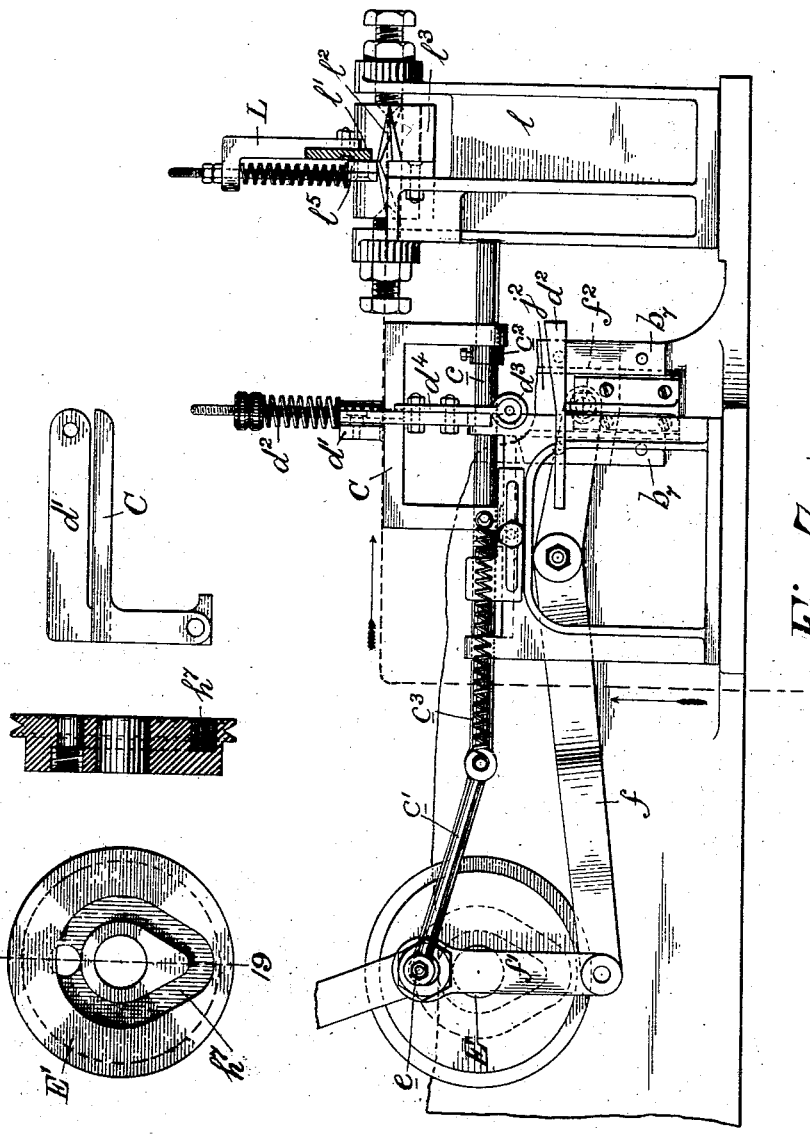

No. 623,213. Patented Apr. 18, 1899.
W. HOLMES, G. PENNY & J. HODGSON, Jr.
MACHINE FOR MAKING LABELS.
(Application filed June 7, 1897.)
(No Model.) 8 Sheets—Sheet 6.

No. 623,213. Patented Apr. 18, 1899.
W. HOLMES, G. PENNY & J. HODGSON, Jr.
MACHINE FOR MAKING LABELS.
(Application filed June 7, 1897.)
(No Model.) 8 Sheets—Sheet 8.
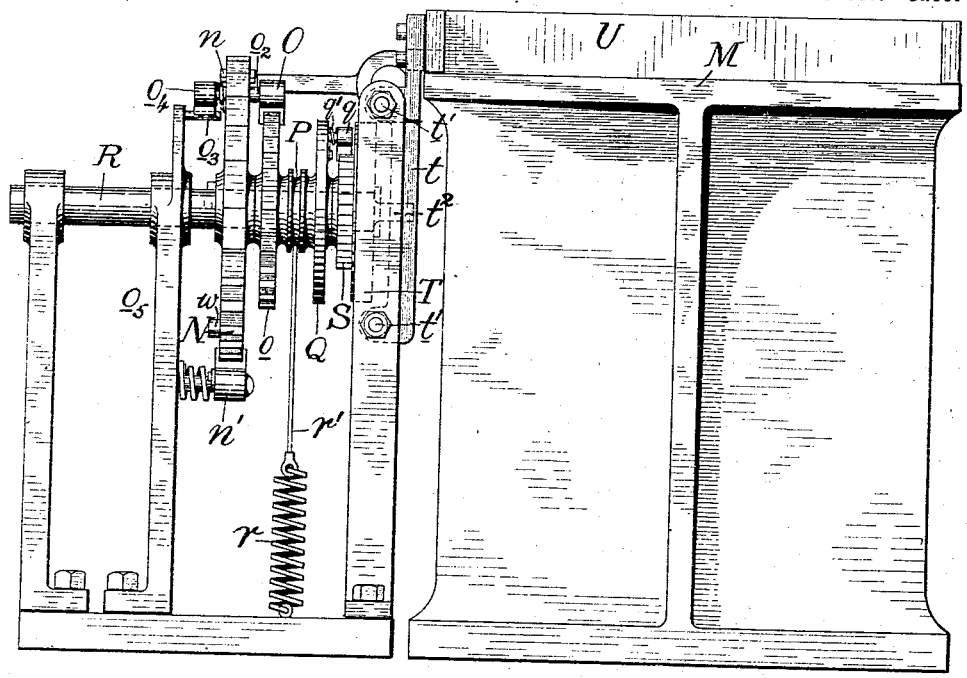
Fig. 11.
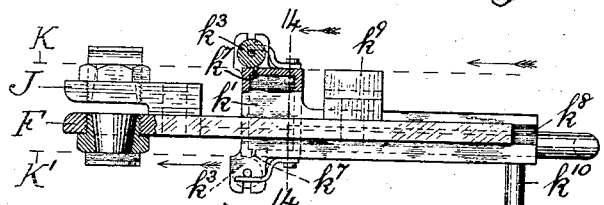
Fig. 12.
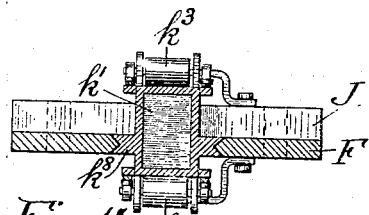
Fig. 14.
Fig. 15.
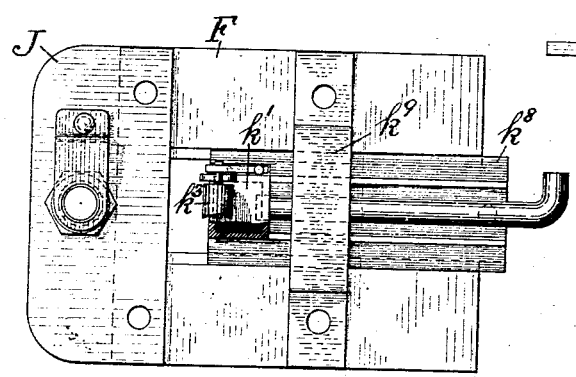
Fig. 13.
Fig. 16.
Witnesses:
Inventors:
William Holmes
George Penny
James Hodgson Jr.
By 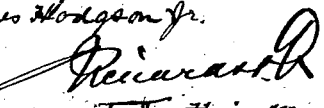
their Attorneys.

UNITED STATES PATENT OFFICE.

WILLIAM HOLMES, GEORGE PENNY, AND JAMES HODGSON, JR., OF ULVERSTON, ENGLAND; SAID HOLMES AND PENNY ASSIGNORS TO SAID HODGSON.

MACHINE FOR MAKING LABELS.

SPECIFICATION forming part of Letters Patent No. 623,213, dated April 18, 1899.

Application filed June 7, 1897. Serial No. 639,743. (No model.)

*To all whom it may concern:*

Be it known that we, WILLIAM HOLMES, GEORGE PENNY, and JAMES HODGSON, Jr., residing at Ulverston, in the county of Lancaster, England, have invented an Improved Combined Machine for the Manufacture and Printing of Labels, of which the following is a specification.

This invention relates to a combined machine operating from a single first-motion shaft for the printing, cutting, chamfering, and affixing of paper washers to a label produced from an endless web of paper; and it consists of improved means operated from the first-motion shaft for the intermittent and adjustable feed of the said web for the perforation, gumming, and affixing of washers upon the said labels, and for the transverse cutting and chamfering of the said labels from the said web in one operation, and in order that our invention may be the better understood we now proceed to describe the same in reference to the drawings hereto annexed and to the letters marked thereon.

Figure 1:
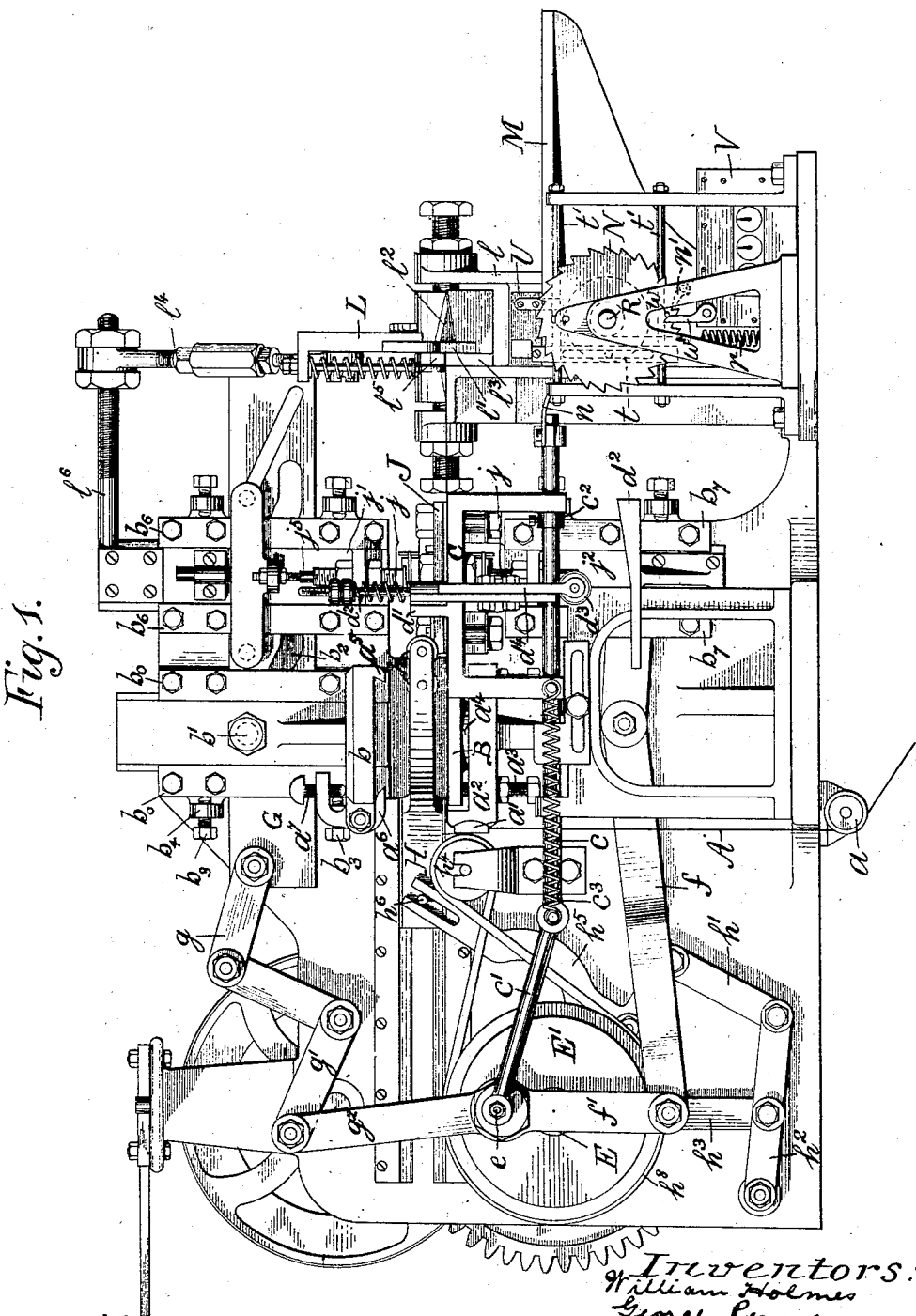
Figure 2:
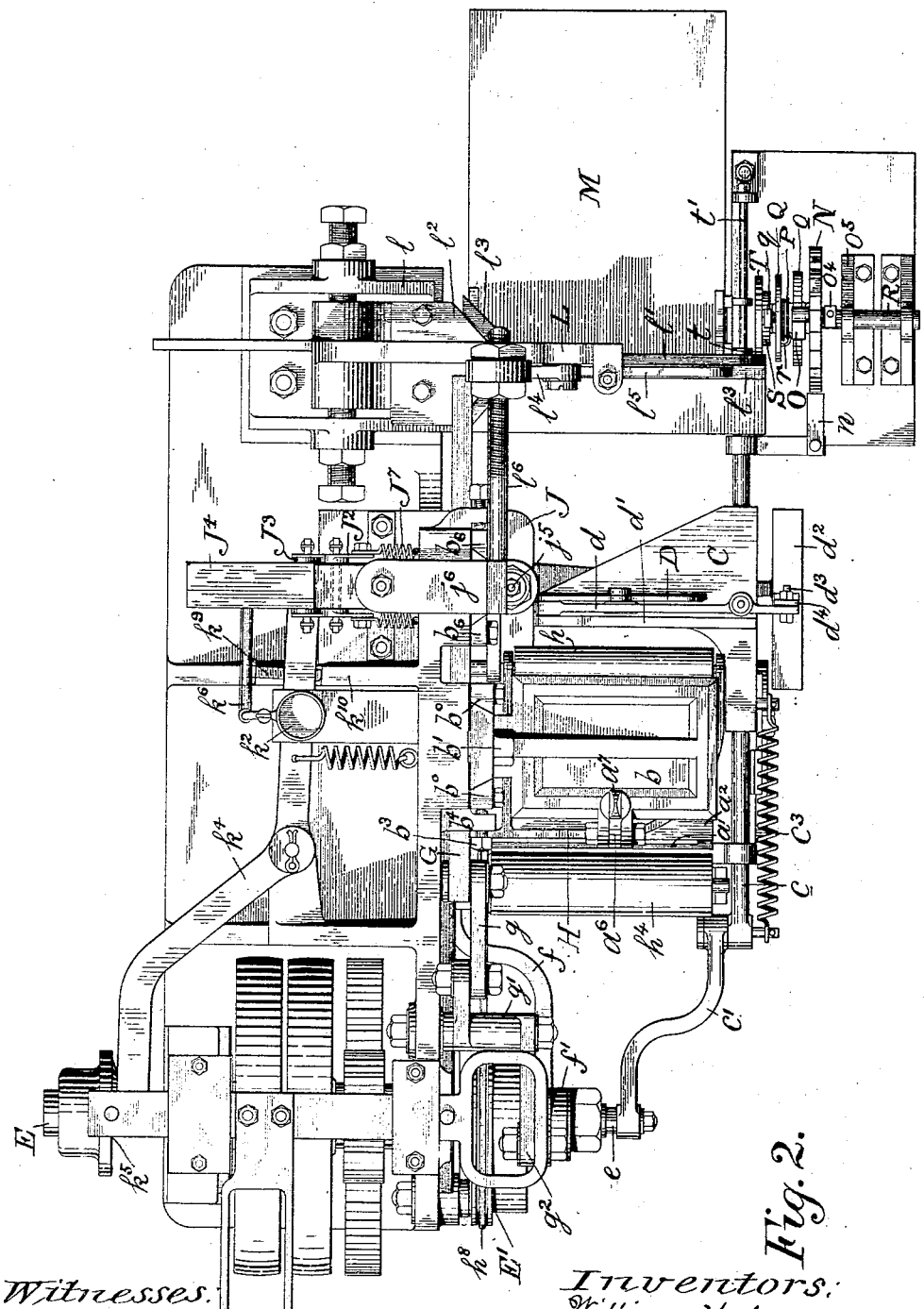
Figure 8:
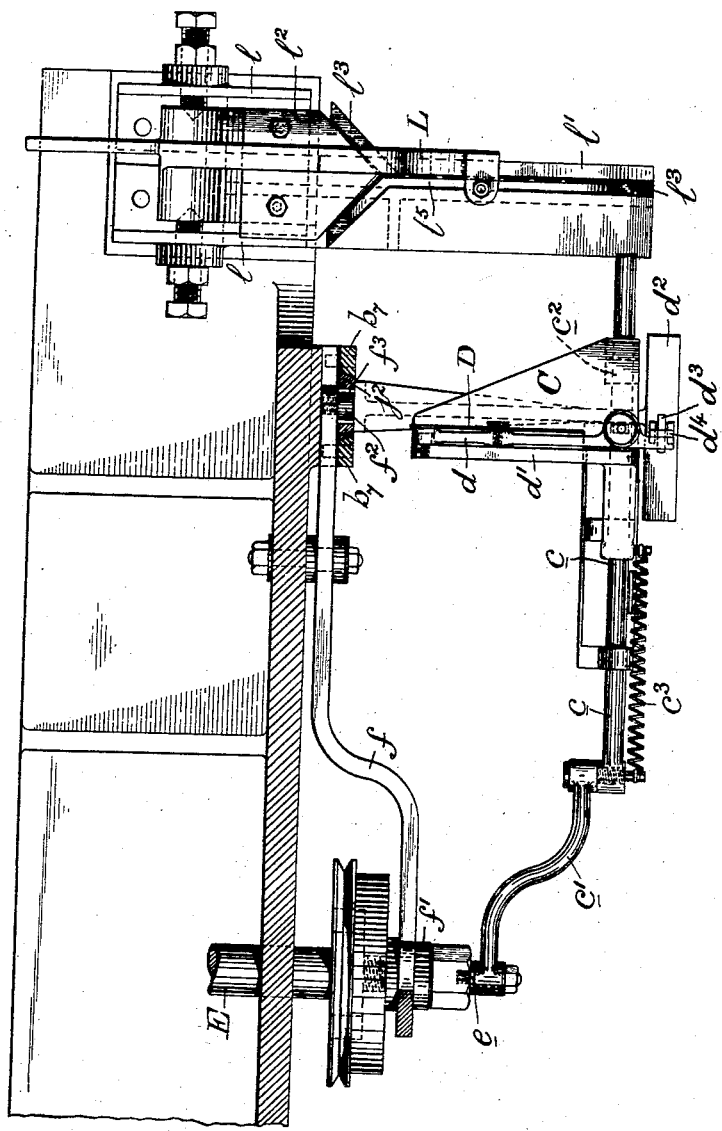
Figure 9:
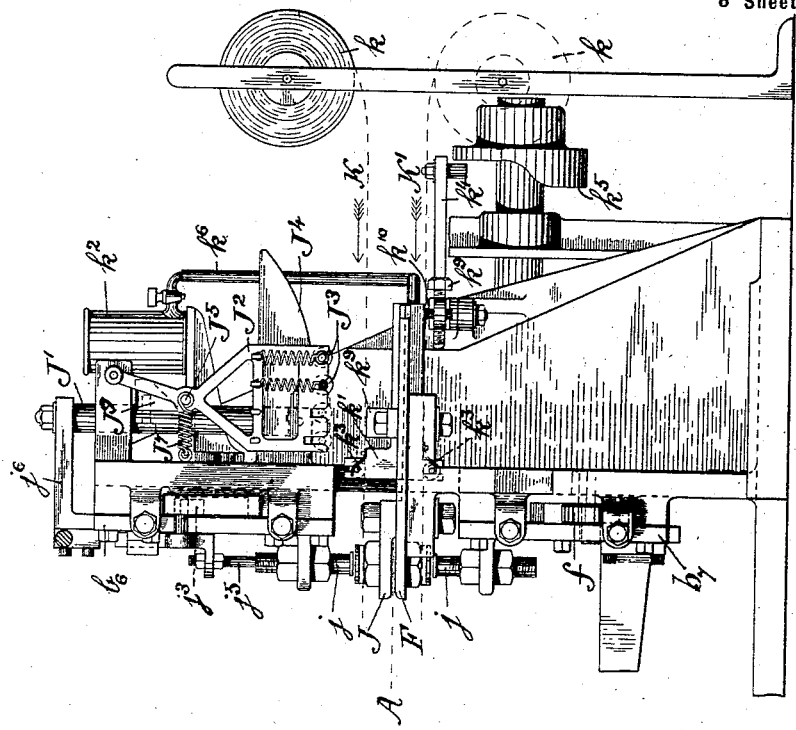
Figure 10:
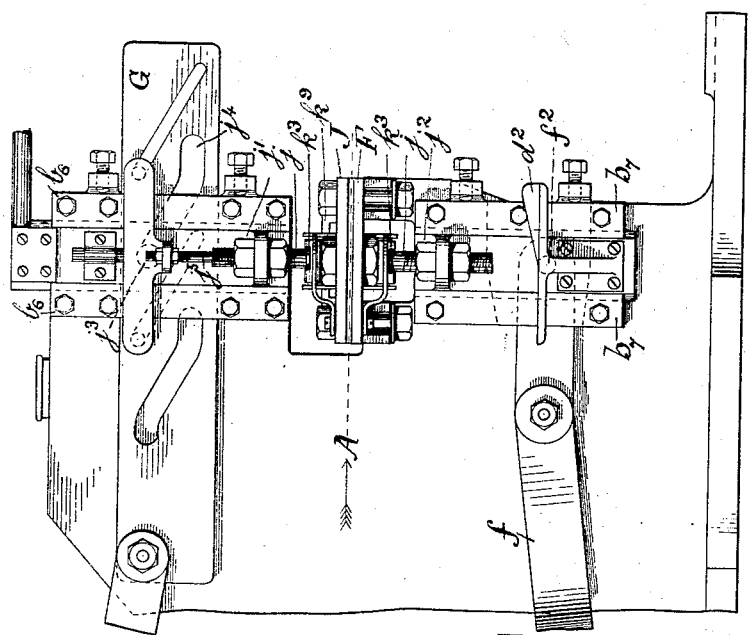

Figure 1 is a side elevation of the combined label cutting, forming, and printing machine. Fig. 2 is a plan of the same. Fig. 3 is a detached side elevation of the label-printing mechanism and means for operating the same. Fig. 4 is a detached end elevation of the said printing mechanism. Fig. 5 is a detached end elevation of the web-feeding mechanism. Fig. 6 is an end elevation of the cutting mechanism. Fig. 7 is a detached side elevation of the label-web-feeding mechanism and of the cutting mechanism. Fig. 8 is a detached plan of the same. Fig. 9 is a detached end elevation of the transverse feed mechanism for the two washer-webs and also of the punches for stamping out, perforating, and affixing the washers, together with printing-stamp and inking apparatus therefor. Fig. 10 is a broken side elevation of the same. Fig. 11 is a detached and enlarged end elevation of the mechanism for the delivery of piles containing a specified number of labels. Fig. 12 is an enlarged side elevation of the washer-web feeding and gumming box. Fig. 13 is an enlarged plan of the same. Fig. 14 is a section through the line 14 14 in Fig. 12, looking in the direction of the arrow. Fig. 15 is a detached detail of the chamfer-cutting knife and matrix. Fig. 16 shows the construction of the punches for stamping out, affixing, and perforating the reinforce washers or tabs. Fig. 17 is a detached side elevation of the adjustable link operating the cutting mechanism. Fig. 18 is a back elevation of the combined crank and cam disk driving the main mechanism. Fig. 19 is a sectional elevation on the line 19 19 of Fig. 18. Fig. 20 is a detached detail of the label-web feed-table.

A, Fig. 1, is the web of paper or suitable material from which the labels are to be cut. It is of a suitable width to correspond exactly to the length of the labels required, which are thus cut transversely from the end of such web or strip A. The said web or strip is supplied from a suitable reel under the machine and is carried over a guide-roller $a$, Fig. 1, and between the plate $a'$, Figs. 1, 2, and 3, and the platen-supporting table $a^2$, Figs. 1, 2, 3, and 4, to which the plate $a'$ is attached at its ends, the attachments serving as guides to the web. The web is brought over the platen-face B, Figs. 1, 3, and 4, which is adjustably supported on the supporting-table $a^2$ by means of four set-screws $a^3$ $a^3$, Figs. 1, 3, and 4, and the central sliding pillar $a^4$, Figs. 1, 3, and 4, to the feed-table C, Figs. 1, 2, 5, 7, and 8, passing under the overreaching arm $d'$, Figs. 1, 2, 5, 7, and 8, which projects from and over the feed-table C, as shown in detail in Fig. 20, and is gripped upon that feed-table by a wrought-iron plate D, Figs. 2, 5, and 8, attached to the bar $d$, Figs. 2, 5, and 8, which bar is itself pivoted to the arm $d'$, the said wrought-iron plate being pressed by its own weight and by the adjustable spring $d^2$, Figs. 1, 5, and 7, on the said web A where it lies on the feeding-table C. The web is fed forward by the reciprocation of the feed-table C and gripper D thereon, effected by spring push-bar $c$, Figs. 1, 2, 5, 7, and 8, which has a constant travel from the connecting-rod $c'$, Figs. 1, 2, 5, 7, and 8, and the crank-pin $e$, Figs. 1, 2, 5, 7, and 8, of the first-motion shaft E, Figs. 1, 2, 5, 7, and 8. The reciprocation of the feed-table C can, however, be adjusted as to its travel in one direction by a movable collar $c^2$, Figs. 1, 7, and 8, on the push-bar $c$, (the table being kept home on this collar by a tension-spring $c^3$, Figs. 1, 2, 7, and 8,) and as regards the limit of its return travel by an adjustable slotted stop $c^4$ on the frame of the machine, checking the backward travel of the table C before the bar $c$ has finished its reciprocation. The point at which the push-bar $c$ commences to push the table C from left to right is determined by the position of the collar $c^2$ upon the push-bar $c$, and on the return stroke from right to left the distance which the table C travels in that direction is limited by the adjustable stop $c^4$, bolted to the frame. When the table C and web A therewith is carried over to its extreme position to the right, the end of the web is made, originally by hand, to project sufficiently far to come under the second gripper $l^5$, Figs. 1, 2, 6, 7, and 8, on the knife-beam and is there held as the knife-beam descends, as hereinafter more fully described. When the feed-table C returns, the gripper D is lifted on its pivoted bar $d$ by the wheel $d^3$, Figs. 1, 2, 5, 7, and 8, at the end of the adjustable arm $d^4$ coming in contact with the plate $d^2$, Figs. 1, 2, 5, 7, and 8, which plate is attached to an under punch-plate F, Figs. 1, 5, 7, 8, and 10, and rises with it when the latter is forced up by the rocking lever $f$, Figs. 1, 2, 5, 7, 8, and 10, and link $f'$, Figs. 1, 2, 5, 7, and 8, connected to the crank-pin $e$. The table C is thus free to slide back under the web A, which latter is held in a fixed position both by the punches entering the same and by the gripper $l^5$, attached to the knife-beam, hereinafter to be described. While the web A is at rest after having been fed forward an upper type-back $b$, Figs. 1, 2, 3, and 4, containing the required type in a chase, descends upon the platen B, on which the web rests, and the labels are there printed, the said chase (not shown in the figures) being secured to the type-back by means of the inwardly-sloping ledge $a^5$, Figs. 1, 3, and 4, and the locking-in lever $a^6$, Figs. 1, 2, 3, and 4, which is adjusted by means of the thumb-screw $a^7$, Figs. 1, 2, 3, and 4. The type-back $b$ slides in a race formed on the back frame of the machine between the two guides $b$ $b$, Figs. 1, 2, 3, and 4, of which the left-hand one is adjustable by means of the set-screws $b_3$ $b_3$, Figs. 1, 2, and 3, carried by projections from the main casting. (Denoted by $b_4 b_4$ in Figs. 1, 2, and 3.) The said type-back $b$ is caused to reciprocate by means of a stud $b'$, Figs. 1, 2, 3, and 4, which enters an inclined slot $b^2$, Figs. 1, 3, and 4, in the back plate G, Figs. 1, 2, 3, and 4, which is given a horizontal reciprocation in the race $b_5$, Fig. 4, formed between the main casting and the guides $b_0 b_0 b_6 b_6$, Figs. 1 and 2, by link $g$, Figs. 1, 2, and 3, bell-crank $g$, Figs. 1, 2, and 3, and link $g^2$, Figs. 1, 2, and 3, from the crank-pin $e$. On the ascent of the type-back $b$ a spring-steel roller-carriage H, Figs. 1, 3, and 4, with two inking-rollers $h$, Figs. 1, 2, 3, and 4, passes under the type by means of a rocking lever $h^5$, Figs. 1 and 3, with forked end over a stud $h^6$, Figs. 1 and 3, in said carriage operated by link $h'$, Figs. 1 and 3, rocking bar $h^2$, Figs. 1 and 3, and link $h^3$, Figs. 1 and 3, taking reciprocation from a grooved cam $h^7$, Figs. 5, 18, and 19, on the first-motion shaft E. The inking-rollers $h$ come back to an inking-cylinder $h^4$, Figs. 1, 2, 3, and 4, which receives ink from a reservoir in any convenient manner and is revolved by nut $h^8$, Figs. 1, 2, and 3, from the grooved rim of the crank-disk E', Figs. 1, 2, 3, and 18, on the shaft E.

After the label has been printed and has been moved forward by the table C it is in a position between the under die-plate F, Figs. 9, 10, 12, 13, and 14, and the over die-plate J, Figs. 1, 2, 9, 10, 12, 13, and 14, to receive the reinforce-washers in a manner now to be described. The material for the said washers is fed from two reels $k$ $k$ to the machine, as indicated in Fig. 9, transversely across the travel of the main strip A, as two separate strips or webs K K', Figs. 9 and 12, one above and one below the said main label-strip. Each washer-web, however, before coming in its course to the main label-strip passes through a gumming device, which also serves to feed the washer-webs from the reels $k$ $k$ to their respective positions above and below the label-strip A. This device consists of the sliding gum-box $k'$, Fig. 9, (shown in detail in Figs. 12, 13, and 14,) which is supplied with gum from the gum-reservoir $k^2$, Figs. 2 and 9, by a flexible tube $k^6$, Figs. 2 and 9. The gum-box is provided with two spring-pressed rollers $k^3$ $k^3$, Figs. 9, 10, 12, 13, and 14, one above and one below, situated against slots $k^7$ $k^7$, Fig. 12, in the gum-box, and the webs are introduced between the said rollers $k^3$ $k^3$ and the top and bottom faces of the gum-box, respectively. The edges of the gum-box platform $k^8$, Figs. 12 to 14, are grooved so as to enable the platform and gum-box to slide on the lower die-plate $k'$. The gum-box receives its reciprocation from a spring reacting rocking lever $k^4$, Figs. 2 and 9, behind the frame, which receives a rocking motion from an inclined cam-face $k^5$, Figs. 2 and 9, on the shaft E and engages with a pin $k^{10}$, Figs. 9 and 12, on the under surface of the platform $k^8$. The length of the travel of the gum-box can be adjusted by means of the screw-stop $k^9$, Figs. 2 and 9, on the rocking lever, which abuts against the bracket $k^{10}$, Figs. 2 and 9, of the frame of the machine. The forward movement of the gum-box feeds the webs K K' to the label-web A (see Fig. 9) by the grip of the spring-pressed rollers $k^3$ $k^3$ on the said webs K K', but on the return movement of the gum-box the web is kept stationary by the action of the washer-forming punches, about to be described, so that the webs are drawn between the rollers $k^3$ $k^3$ and the slots $k^7$ $k^7$ in the gum-box and are gummed on the surfaces presented to the label. The upper and lower punches $jj$, Figs. 1, 9, 10, and 16, for punching out the washers from the webs K K' are adjustably mounted upon an over punch-plate $j'$, Figs. 1 and 10, and an under punch-plate $j^2$, Figs. 1 and 10, respectively, of which the former receives its reciprocation between the guides $b^6 b^6$, Figs. 9 and 10, by a stud $j^3$, Figs. 9 and 10, which works in an inclined slot $j^4$, Fig. 10, in the horizontally-sliding plate G, while the under punch-plate receives its reciprocation between the two guides $b_7 b_7$, Figs. 7 to 10, from the rocking lever $f$, Figs. 7 to 10, by means of the pin $f^2$, Figs. 7, 8, and 10, which enters the recess $f^3$, Fig. 8, in the punch-plate. The punches $jj$ on the punch-plates $j'$ and $j^2$ are annular and of the diameter of the circular washer or tab, and these punches cut out the said circular washers from the webs K K' as the latter rest on the upper and under faces, respectively, of the die-plates J and F, Figs. 9, 10, and 12, between which the label A passes. The punches $jj$ carry the cut-out washers through the die-plates J and F on to each face of the label-web and the washers are pressed thereon by the punches $jj$ meeting on the label-web A, and while in this position the central perforating-punch $j^5$, Figs. 1, 2, 9, 10, and 16, travels through the upper punch $j$, which is perforated to receive it, (see Fig. 16,) and enters the lower punch $j$, which is similarly perforated, thus punching a central hole through both the washers and the label. From the head of the punching-plate $j'$ we may adapt a cross-head $j^6$, Figs. 2 and 9, to carry a printing stamp-bar J', Fig. 9, which descends on the upper tab-web K at the same time as that of the descent of the upper punch $j$, and may thus print any desired matter upon the circular washer or tab, an arched platen surface $k^9$, Figs. 9, 10, 12, and 13, being provided, spanning over the feed gum-box platen $k^8$ and supporting the upper web K for printing. In such cases we provide a pivoted frame J², Figs. 2 and 9, carrying spring-pressed inking-rollers J³, Figs. 2 and 9, which are caused by the tension of the springs J⁷, Figs. 2 and 9, to traverse over an inking-slab J⁴, Figs. 2 and 9, and the end of the washer-printing stamp J' when the latter is stationary at the top of its stroke. When the stamp J' begins to descend, the frame J² is quickly forced aside, removing the rollers J³ from underneath the said stamp by a nose or cam J⁹, Fig. 9, on the back of the said stamp striking a roller J⁵, Fig. 9, on the pivoted roller-frame. The tab-washers having been thus printed, gummed, punched out of web, affixed to label, and centrally perforated by central punch, the printed label-web, with tab-washers affixed and punched and printed, if desired, is fed on to the cutting-knife.

The knife-beam L, Figs. 1, 2, and 6 to 8, is pivoted on a frame $l$, Figs. 1, 2, and 6 to 8, and carries an inclined shear-blade $l'$, Figs. 1, 2, and 6 to 8, which commences to cut at the point and gradually cuts to the heel. Upon the same beam is attached a distinct under knife $l^2$, Figs. 1, 2, 6 to 8, and 15, for cutting the V-shaped recesses between the heads of each label, thus producing a label with the top corners chamfered off. The lower V-shaped knife $l^2$ first cuts out the V-recess in the edge of the web and sinks below the label into a similar shear-recess in the lower main knife $l^3$, Figs. 1, 2, 6 to 8, and 15, and the upper knife thereafter cuts the label from the web by cutting through the center of the V-shaped recess. The knife-beam may be operated, as shown, by an adjustable connecting-rod $l^4$, Figs. 1, 2, 6, and 17, from the cross-head $l^6$, Figs. 1, 2, and 17, fixed to the reciprocating punch-slide J. The labels are thus completed and severally detached or cut from the web and fall upon the delivery-table M, Figs. 1, 2, and 11, where they are allowed to collect up to a certain specific number—say twenty-five—and are delivered by a counting mechanism, the first member of which consists, conveniently, of a ratchet-wheel N, Figs. 1, 2, and 11, with the number of teeth equivalent to the number of labels in the pile to be automatically pushed aside or counted. This ratchet-wheel can rotate in one direction only on account of the spring-pressed detent $n'$, Figs. 1 and 11, and is operated by a pawl $n$, Figs. 1, 2, and 11, from the reciprocating bar $c$ of the feed-table C, and in turn the said wheel operates, by means of the spring-pressed catch O, Figs. 2 and 11, the second ratchet-wheel $o$, Figs. 2 and 11, thus causing the casting, consisting of the ratchet-wheel $o$, the grooved pulley P, Figs. 2 and 11, and the disk Q, Figs. 2 and 11, which is loose on the shaft R, Figs. 1, 2, and 11, to be carried around with the rotation of the ratchet-wheel N against the tension of the spring $r$, Figs. 1, 2, and 11, which is attached to the grooved pulley P by means of the cord $r'$, Fig. 11. The disk Q carries a spring-pressed catch $q$, Figs. 2 and 11, which is made to lightly press against the third ratchet-wheel S, Fig. 2 and 11, which is also loose on the shaft, by means of the spring $q$, Fig. 11, the catch $q$ being so arranged that it moves over the teeth of the ratchet-wheel, and consequently communicates no motion to it during the intermittent rotation of the ratchet-wheel N. When, however, the ratchet-wheel N has completed one revolution, corresponding with the formation of one pile of twenty-five labels, the catch $o^4$, Figs. 2 and 11, which is rigidly connected by the spindle $O^2$, Fig. 11, to the catch O is lifted by coming in contact with the pin $o^3$, Fig. 11, fixed to the standard $o^5$, Figs. 2 and 11, thereby disengaging the catch O from the ratchet-wheel $o$. The tension of the spring $r$, no longer resisted by the catch O, causes the grooved wheel P, and with it the disk Q, to rotate in the contrary direction to that in which they were driven, thereby causing the spring-pressed catch $q$ to engage with the ratchet-wheel S and causing one revolution of the same. Attached to the ratchet-wheel S and fitting loose on the shaft is the disk T, Figs. 2 and 11, which on rotating with the wheel S drives, by means of a pin $t^2$, Fig. 11, the sliding slotted bar $t$, Figs. 1, 2, and 11, once to and fro on the guiding-bars $t'$ $t'$, Figs. 1, 2, and 11, thereby causing the delivery-fence U, Figs. 1 and 11, to travel to and fro on the table M, delivering a bundle of twenty-five labels and returning to its initial position. This entire operation is repeated on the formation of every pile of twenty-five labels. An ordinary counting-train of wheels inclosed in a casing V, Fig. 1, can be operated by means of the action of a pin $w$, Figs. 1 and 11, on a lever $w'$, Fig. 1, connected with the counting-train, so that the complete production of the machine for any period may be counted and recorded.

Having now particularly described and ascertained the nature of this said invention, what we desire to secure by Letters Patent is—

1. In a label-manufacturing machine, in combination, a reciprocating feed-table; a push-bar from the main crank operating said feed-table; adjustable collars thereon giving lost motion to the push-bar, a return-spring connection between the push-bar and the table; an adjustable stop-lug on the main frame to limit the return travel of the table; a lifting and retaining gripper pivoted on the table, retaining the label-web on the forward feed, and releasing the web on the return stroke; a sliding incline-lift to said gripper-bar as means to release the same from the paper; and a lifting and retaining gripper on the knife-beam to hold the paper web from return, substantially as described.

2. In a label-manufacturing machine, means to feed and simultaneously gum a pair of washer or tab webs fed transversely to a main web, consisting of, in combination, a reciprocating gum-box with issue-slots for the gum; means for reciprocating said box from a first-motion shaft; spring-pressed rollers over the gum-slots, gripping washer-webs for feed, and gumming said webs on return stroke of webs over gum-issue slots; and descending punches and fixed die-plates, to hold the washer-webs from return with gum-box, substantially as described.

3. In a label-manufacturing machine, the combination with a grip and release reciprocating device, to intermittently feed forward a continuous paper web, of a pivoted upper straight-cut knife and beam adapted to cut obliquely from toe to heel; a lower V-shaped knife upon said reciprocating beam; means for reciprocation of said knife-beam from a first-motion shaft that also operates said feed device; and an underfixed shear-plate and V-recessed matrix to simultaneously chamfer the top edges of the labels, and divide the finished labels from one another, substantially as described.

In testimony whereof we have signed our names to this specification in the presence of two subscribing witnesses.

WILLIAM HOLMES.
GEORGE PENNY.
JAMES HODGSON, JR.

Witnesses:
EDITH M. WILLIAMS,
WILLIAM ROGERS.